(12) United States Patent
Takahashi (10) Patent No.: US 7,570,363 B2
(45) Date of Patent: Aug. 4, 2009

(54) MEASURING ENDOSCOPE APPARATUS

(75) Inventor: Susumu Takahashi, Iruma (JP)

(73) Assignee: Olympus Corporation, Tokyo (JP)

( * ) Notice: Subject to any disclaimer, the term of this patent is extended or adjusted under 35 U.S.C. 154(b) by 388 days.

(21) Appl. No.: 11/670,032

(22) Filed: Feb. 1, 2007

(65) Prior Publication Data
US 2007/0177153 A1 Aug. 2, 2007

(30) Foreign Application Priority Data
Feb. 2, 2006 (JP) .............................. 2006-025667

(51) Int. Cl.
*G01B 9/02* (2006.01)
(52) U.S. Cl. ..................................... 356/479
(58) Field of Classification Search ................. 356/478, 356/479, 497
See application file for complete search history.

(56) References Cited

U.S. PATENT DOCUMENTS

| | | | | |
|---|---|---|---|---|
| 5,555,086 | A * | 9/1996 | vonBieren et al. | 356/479 |
| 6,501,551 | B1 * | 12/2002 | Tearney et al. | 356/479 |
| 6,687,010 | B1 * | 2/2004 | Horii et al. | 356/479 |
| 6,741,355 | B2 * | 5/2004 | Drabarek | 356/479 |
| 7,355,716 | B2 * | 4/2008 | de Boer et al. | 356/479 |
| 7,417,740 | B2 * | 8/2008 | Alphonse et al. | 356/479 |
| 7,423,761 | B2 * | 9/2008 | Teramura et al. | 356/479 |
| 2002/0131049 | A1 * | 9/2002 | Schmitt | 356/479 |
| 2003/0086093 | A1 * | 5/2003 | Bush | 356/479 |
| 2003/0137669 | A1 * | 7/2003 | Rollins et al. | 356/479 |
| 2006/0103850 | A1 * | 5/2006 | Alphonse et al. | 356/479 |

OTHER PUBLICATIONS

Mitutoyo Co., Ltd. Products Information (found online on Dec. 19, 2006 at Internet URL:http://www.mitutoyo.co.jp/eng/products/keijyou_hyomen/hyomen_01.html.

* cited by examiner

*Primary Examiner*—Patrick J Connolly
(74) *Attorney, Agent, or Firm*—Arnold International; Bruce Y. Arnold (57) ABSTRACT

A measuring endoscope apparatus is disclosed having a light source unit that emits low coherence light, a probe that illuminates the observation object with the low coherence light and that collects light reflected by the observation object, and a single optical fiber that optically connects the light source unit and the probe. The light source unit includes a first low coherence light splitting part and an optical path length adjustment part. The probe includes a second low coherence light splitting part, a low coherence light multiplexing part, a lens that forms images using light returned from the observation object and an image detector that captures interference patterns and/or images using light reflected by the observation object. By using the low coherence light, surface conditions, such as roughness, can be accurately measured.

4 Claims, 5 Drawing Sheets

MEASURING ENDOSCOPE APPARATUS

This application claims the benefit under 35 U.S.C. 119 of JP 2006-25,667 filed Feb. 2, 2006, the contents of which are hereby incorporated by reference.

BACKGROUND OF THE INVENTION

Among apparatuses for obtaining information about the surface of a measuring object such as surface roughness and profile, one is known that employs a contact probe, see Mitutoyo Co., Ltd, Products Information (found online on Dec. 19, 2006) at Internet URL: http://www.mitutoyo.co.jp/eng/products/keijyou_hyomen/hyomen_01.html. In this surface nature measuring apparatus, the contact probe makes contact with and moves relative to the surface of a measuring object. The distance the contact probe moves along the surface profile of the measuring object is detected to measure the profile of the measuring object. However, the contact probe has a limitation in measuring the surface profile. For example, the inner profile of a pore can be measured using a small contact probe when the pore has a relatively large cross-sectional area with a nearly constant inner diameter in the depth direction. However, when the pore has an inner diameter that is small at the entrance and increases in the depth direction, a small probe that can pass through the entrance of a pore does not make contact with the inner wall at the bottom. In such a case, measurement is inconveniently difficult.

BRIEF SUMMARY OF THE INVENTION

The present invention relates to a measuring endoscope apparatus for measuring the surface roughness of an observation object and for forming images indicative of the surface condition for observation.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention relates to a measuring endoscope apparatus for measuring the surface roughness of an observation object that is difficult to accurately measure using a contact probe. The measuring endoscope apparatus of the present invention includes a light source unit that is provided with a low coherence light source that emits low coherence light, a probe that illuminates an observation object with the low coherence light emitted from the light source unit and that collects the light reflected by the observation object, and a single optical fiber that optically connects the light source unit and the probe. The light source unit includes a first low coherence light splitting part that splits the low coherence light emitted from the low coherence light source into a first low coherence light and a second low coherence light, an optical path length adjustment part that adjusts the optical path length of the first low coherence light, and an optical multiplexing part that multiplexes the first low coherence light (after its optical path length has been adjusted by the optical path length adjustment part) with the second low coherence light onto the single optical fiber. The probe includes: a second low coherence light splitting part that separates the first low coherence light from light transmitted through the single optical fiber; a low coherence light multiplexing part that multiplexes the second low coherence light that has been reflected by the observation object with the first low coherence light split by the second low coherence light splitting part; a lens (such as a gradient index lens) that conjugates a measuring surface position to an image surface at which an image detector is positioned; and an image detector that captures images formed by the lens as well as interference patterns.

According to the present invention, the coherent light emitted from the low coherence light source is split into first and second low coherence lights by the first low coherence light splitting part provided in the light source unit. The first low coherence light has its optical path length adjusted by the optical path length adjustment part and is then multiplexed onto the single optical fiber with the second low coherence light and, optionally, excitation light emitted from an illumination light source. Among the first and second low coherence lights transmitted through the single optical fiber, the second low coherence light illuminates the observation object after it is split from the first low coherence light by the second low coherence light splitting part provided in the probe. The second low coherence light that illuminates the observation object is reflected by the observation object back to the probe where it is multiplexed with the first low coherence light by the low coherence light multiplexing part and, when the path lengths of the first and second low coherence lights are equal, forms an interference pattern on the image detector. More specifically, when the optical path adjustment part is operated so that the optical path length of the first low coherence light precisely matches the optical path length of the second low coherence light, both low coherence lights will interfere with each other so as to produce interference fringes at the image detector. These interference fringes are monitored for each point on the observation object to thereby enable the distance between the probe and each point on the observation object to be accurately measured.

The present invention allows two low coherence lights that are multiplexed onto a single optical fiber to be equally influenced by changes of the optical fiber as the probe is moved about, thereby preventing deterioration in measuring accuracy that otherwise would occur if the two low coherence lights were differently influenced.

The invention may also include a structure in which an illumination light source is provided that causes the observation object to be illuminated with illumination light of the same wavelength as emitted by the illumination light source or a longer wavelength, and wherein a probe illuminates the observation object with the illumination light and with low coherence light. In this instance a lens, such as a gradient index lens, images the multiplexed low coherence lights and the illumination light reflected by the observation object onto an image detector. With this structure, both the illumination light and the second low coherence light illuminate the observation object, are reflected by the surface of the observation object, and are imaged by the lens onto an image detector.

The invention can further have a structure in which the low coherence light emitted from the low coherence light source is linearly polarized light; the optical path adjustment part is formed of a movable mirror that is movable along the optical path of the first low coherence light and that reflects the first low coherence light so as to reverse the optical path thereof; and a polarizing member that rotates the polarization direction of the first low coherence light reflected and returned by the movable mirror by a total of 90 degrees; and the second low coherence light splitting part that is formed of a polarizing beam splitter that reflects one of the first low coherence light and the second low coherence light and that transmits the other.

With the above-described structure, the low coherence light emitted from the low coherence light source that is a linearly polarized light is split by the first low coherence light splitting part, reflected and returned by the movable mirror, and multiplexed by the low coherence light multiplexing part. The movable mirror is movable along the optical path of the first low coherence light so that the optical path length of the first low coherence light may be easily adjusted.

The first low coherence light that is reflected and returned by the movable mirror has its polarization direction rotated a total of 90 degrees by the polarizing member; therefore, two multiplexed low coherence lights having orthogonal polarization directions travel through the optical fiber. The two low coherence lights reaching the probe are split by a polarizing beam splitter that is provided in the probe. One of the two low coherence lights is used to illuminate the observation object and the light thereof that is reflected back into the probe is multiplexed with the other low coherence light. The two low coherence lights are then made to interfere so that interference fringes form on an image detector when the optical paths of the two low coherence lights are equal, thereby enabling the distance to the observation object to be measured with accuracy. Advantageously, the two low coherence lights that interfere with each other have traveled through one and the same optical fiber and thus have been influenced identically.

The invention further can have a structure in which the low coherence light multiplexing part is formed of a polarizing beam splitter that consists of the second low coherence light splitting part; a mirror that reflects one of the low coherence lights split by the polarizing beam splitter; a second polarizing member that is provided between the mirror and the polarizing beam splitter and that rotates the polarization direction of the one low coherence light by a total of 90 degrees; and a third polarizing member for making the polarization directions the same for the low coherence lights multiplexed by the low coherence light multiplexing part.

With the above-described structure, one of the low coherence lights that is transmitted through the polarizing beam splitter and reflected by the mirror has its polarization direction rotated a total of 90 degrees because it passes through the quarter-wave plate twice. This light is then reflected by the polarizing beam splitter. The other low coherence light that is reflected by the polarizing beam splitter is reflected by the observation object and at least partly transmitted through the polarizing beam splitter.

In this way, the reflection or transmission direction of the one low coherence light is made the same as the transmission or reflection direction, respectively, of the other low coherence light, whereby the two low coherence lights are then multiplexed. The polarization directions of the two low coherence lights are made equal by the third polarizing member so that interference fringes are formed at the image detector when the optical path lengths of the two low coherence lights are equal. With this structure, the polarizing beam splitter can function as both the second low coherence light splitting part and the low coherence light multiplexing part, thus simplifying the structure of the probe and allowing its size to be reduced.

A measuring endoscope apparatus according to Embodiment 1 of the present invention will now be described with reference to FIGS. 1 and 2.

Figure 1:
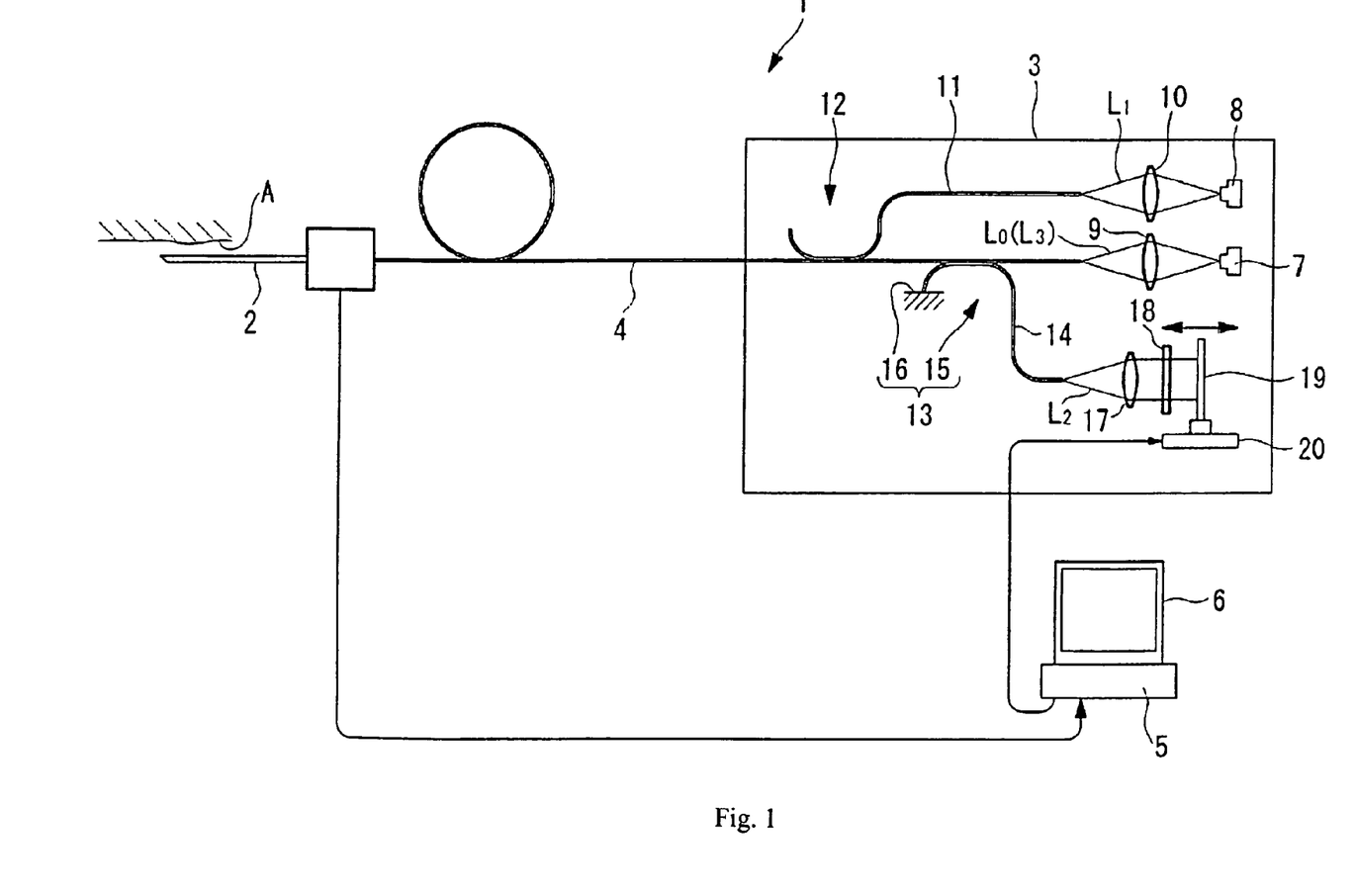
FIG. 1 is an illustration schematically showing the entire structure of a measuring endoscope apparatus according to one embodiment of the present invention.

As shown in FIG. 1, the measuring endoscope apparatus 1 according to this embodiment includes a probe 2 that is placed near an observation object A, a light source unit 3 that supplies low coherence light L0 and excitation light L1 to the probe 2, a single optical fiber 4 that optically connects the light source unit 3 and the probe 2 and that transmits the low coherence light L0 and the excitation light L1 from the light source unit 3 to the probe 2, and a control unit 5 that controls the light source unit 3 and that processes image information obtained by the probe 2. A monitor 6 displays images using image information processed by the control unit 5.

The light source unit 3 includes a low coherence light source 7 that emits low coherence light L0 that is polarized (for example, P-polarized light), an illumination light source 8 that emits excitation light L1 in a wave band for which an image detector (described later) is insensitive, and condensing lenses 9 and 10 that collect the low coherence light L0 and the excitation light L1 emitted from the light sources 7 and 8, respectively. The low coherence light L0 collected by the condensing lens 9 and the excitation light L1 collected by the condensing lens 10 enter the optical fibers 4 and 11, respectively. The optical fibers 4 and 11 are coupled by a first optical coupler 12 whereby the low coherence light L0 and the excitation light L1 are multiplexed onto the optical fiber 4 and travel to the probe 2.

The optical fiber 4 is also provided with a second coupler 15 in a region of the optical fiber that carries the low coherence light L0 emitted by the low coherence light source 7. The second coupler 15 splits the low coherence light L0 into a reference light L2 and a measuring light L3. A first low coherence light splitting part 13 is formed of the second coupler 15 that couples another optical fiber 14 to the optical fiber 4 and a reflecting part 16 located at one end of the optical fiber 14 that reflects the reference light L2 (i.e., the first low coherence light split from the optical fiber 4 by the second coupler 15) so that it travels within optical fiber 14 to the other end of optical fiber 14. Facing that end of the optical fiber 14 are a collimating lens 17, a quarter-wave plate 18, and a movable mirror 19. The movable mirror 19 is provided with a mirror moving mechanism 20. The mirror moving mechanism 20 moves the movable mirror 19 along the optical axis according to command signals from the control unit 5. The measuring light L3 travels through the optical fiber 4 to the probe 2. On the other hand, the reference light L2 (that is the low coherence light directed by the second coupler 15 into the optical fiber 14) is reflected by the reflecting part 16 and is directed through a collimating lens 17 and the quarter-wave plate 18 to the movable mirror 19. After being reflected by the movable mirror 19, the light travels once again through the quarter-wave plate 18, is condensed by the collimating lens 17, re-enters the optical fiber 14, and is then multiplexed by the second coupler 15 onto the optical fiber 4 and transmitted to the probe 2. In this way, the reference light L2 has its polarization direction rotated a total of 90° (thus, the light becomes S-polarized after twice passing through the quarter-wave plate 18) and its optical path length is controlled by the control unit 5.

As described above, the reference light L2 emerging from the end surface of the optical fiber 14 is collimated by the collimating lens 17 and transmitted through the quarter-wave plate 18 two times, whereby it has its polarization direction rotated a total of 90 degrees (for example, it becomes S-polarized light). Therefore, the reference light L2 and measuring light L3, both having low coherence, have their polarization directions orthogonal to one another and are multiplexed with the excitation light L1 on the optical fiber 4 such that each of the excitation light L1, the reference light L2 and the measuring light L3 travel to the probe 2.

Figure 2:
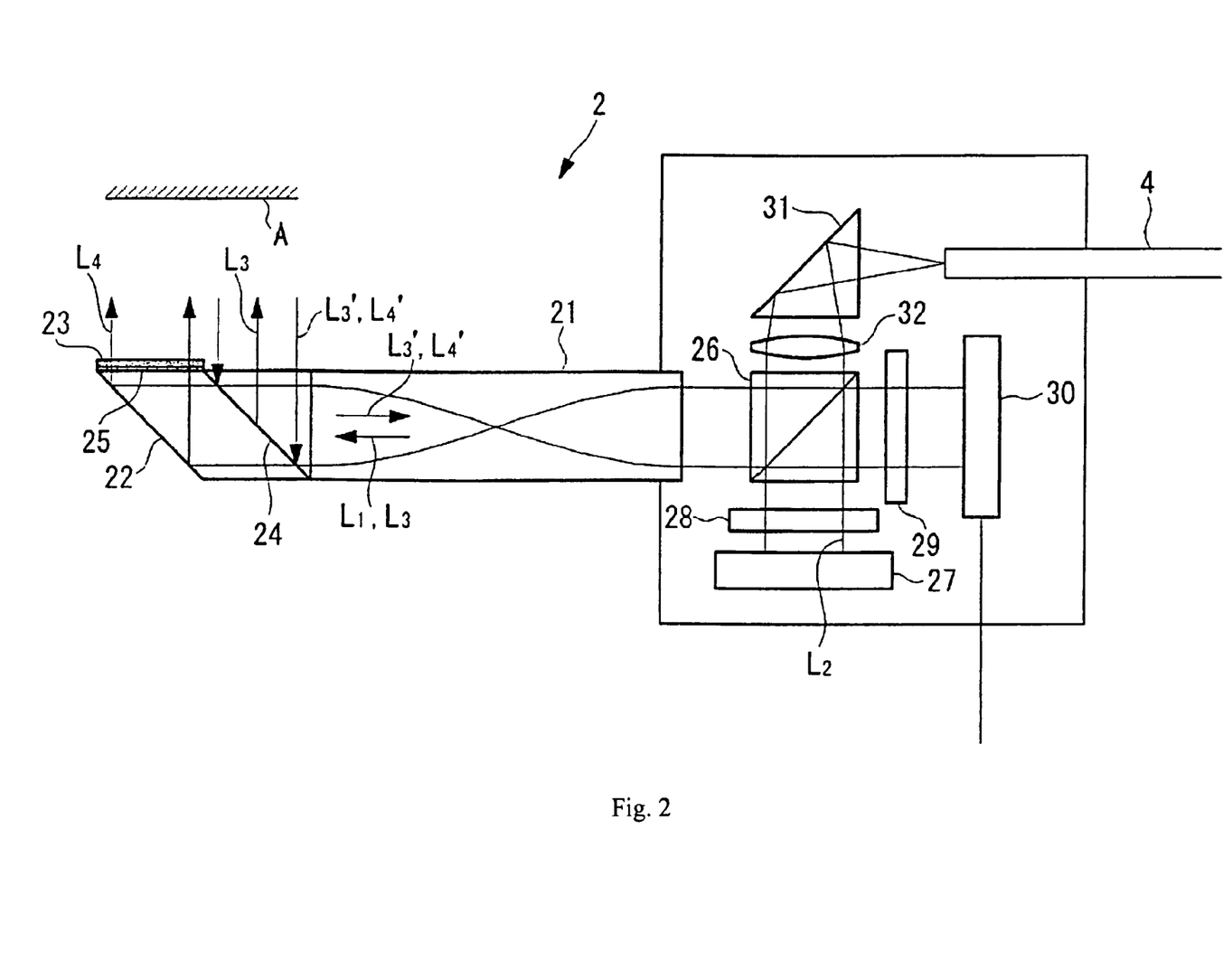
FIG. 2 is an enlarged view schematically showing the structure of the probe of the measuring endoscope apparatus of FIG. 1.

As shown in FIG. 2, the probe 2 is in the form of an elongated rod that may be inserted into a small pore. The probe 2 includes a gradient index lens 21 that relays the excitation light L1 and measuring light L3 entering in the longitudinal direction from its rear end (its base) to the leading end, and a prism 22 that reflects the excitation light L1 relayed to the leading end. The prism 22 is provided with a fluorescent material 23 that is excited by the excitation light L1 so as to emit fluorescence L4 through the outer surface of the probe 2. Near the leading end of the probe 2 there is provided a fluorescence multiplexing prism 24 that reflects the measuring light L3 by 90 degrees so as to emit measuring light L3 from the probe, and that multiplexes fluorescence L4' that has been reflected and returned by the observation object A with the measuring light L3' that has been reflected and returned by the observation object A to the probe 2. A fluorescence reflecting coating 25 is also provided that transmits the outgoing excitation light L1 that has been reflected by the prism 22, and that reflects the fluorescence L4 emitted by the fluorescent material 23 so that the fluorescence does not directly enter the probe.

At the base of the probe 2 there is provided a polarizing beam splitter 26 that, among the excitation light L1, the reference light L2 and the measuring light L3 transmitted through the optical fiber 4, transmits only the reference light L2 consisting of S-polarized light. A mirror 27 is provided that reflects the reference light L2 that has been transmitted through the polarizing beam splitter 26, and a quarter-wave plate 28 is provided between the polarizing beam splitter 26 and the mirror 27. There is also provided near the base of the probe 2 a polarizer 29 and an image detector 30 near the polarizing beam splitter 26. The image detector 30 may be, for example, a CCD (charge coupled device). A prism 31 is provided that receives the light output at the probe end of the optical fiber 4 and that reflects by 90 degrees the lights L1, L2, and L3 transmitted through the optical fiber 4. A collimating lens 32 is positioned between the prism 31 and the polarizing beam splitter 26. The optical power of the gradient index lens 21 is determined in such a manner that, when illuminated by fluorescence emitted by the fluorescent material 23, the surface of the observation object A is conjugated by the gradient index lens 21 so as to form an image on the image detector 30. Since the gradient index lens has a large depth of focus, the tolerance to a deviation from the in-focus state is large. Thus, the gradient index lens 21 performs multiple functions. It conveys lights traveling along the optical fiber in both directions (including low coherence light that has been deformed by being reflected from the observation object A), and it forms an image of the observation object A on the image detector 30 using fluorescence, as discussed above. In FIG. 2, the light rays illustrated are those of the collimated excitation light, and the light rays of the fluorescence have been omitted, for clarity of illustration.

The effects of the measuring endoscope apparatus 1 of the present invention will now be described. While the low coherence light source 7 and the illumination light source 8 are activated, the distance from the leading end of the probe 2 to the surface of an observation object A is measured for observing the surface condition of the observation object A, as shown in FIG. 1. More particularly, the low coherence light L0 and the excitation light L1 enter the end surfaces of the optical fibers 4 and 11 via the condensing lenses 9 and 10, respectively. The excitation light L1 is coupled from the optical fiber 11 to the optical fiber 4. Also, the low coherence light L0 emitted from the low coherence light source 7 is split into two lights (the reference light L2 and the measuring light L3) by a second coupler 15 provided along the optical fiber 4. The reference light L2 is directed by the second coupler 15 into an optical fiber 14, the end of which terminates at a reflecting part 16. After being reflected at the reflecting part 16, the reference light L2 travels back through the optical fiber 14 to the collimating lens 17, quarter-wave plate 18, and movable mirror 19, where the light is reflected again and travels once more through the quarter-wave plate 18, the collimating lens 17 and into the optical fiber 14. A portion of this light is then coupled into the optical fiber 4 by the second coupler 15. The measuring light L3 travels through the optical fiber 4 to the probe 2.

The reference light L2 is reflected by the reflecting part 16 and travels back through the optical fiber 14 to the other end of the optical fiber 14. Emerging from the other end, the reference light L2 is collimated by the collimating lens 17, transmitted through the quarter-wave plate 18, reflected by the movable mirror 19, and again transmitted through the quarter-wave plate 18. Then, the reference light L2 is collected onto the end surface of the optical fiber 14 by the collimating lens 17 and is returned to the optical fiber 4 by the second coupler 15 so as to proceed to the probe 2. By passing through the quarter-wave plate 18 two times, the reference light L2 has its polarization direction rotated a total of 90 degrees relative to the measuring light L3. In addition, the optical path length is appropriately adjusted by moving the movable mirror 19 using the mirror moving mechanism 20. Thus, the reference light L2 and the measuring light L3 travel through the optical fiber 4 to the probe 2 as two multiplexed, low coherence lights that are orthogonally polarized to each other.

The excitation light L1 emitted from the illumination light source 8 travels through the optical fiber 11 and then is multiplexed by the first coupler onto the optical fiber 4 that also carries the reference light L2 and the measuring light L3. Consequently, the excitation light L1, the reference light L2, and the measuring light L3 each travel to the probe 2 through the optical fiber 4.

These three lights, upon reaching the base of the probe 2, enter the polarizing beam splitter 26 after being folded by the prism 31 and collimated by the collimating lens 32. The polarizing beam splitter 26 transmits the reference light L2, which is S-polarized light, and reflects the excitation light L1 and the measuring light L3, which are each P-polarized light. After being transmitted through the polarizing beam splitter 26, the reference light L2 is transmitted through the quarter-wave plate 28, reflected by the mirror 27, and again transmitted through the quarter-wave plate 28. Consequently, the reference light L2 has its polarization direction rotated a total of 90 degrees; therefore, it is reflected by the polarizing beam splitter 26 and directed to the polarizer 29.

On the other hand, the excitation light L1 reflected by the polarizing beam splitter 26 is relayed within the gradient index lens 21 of the probe 2, transmitted through the fluorescence multiplexing prism 24, and reflected 90 degrees by the prism 22 at the leading end of the probe 2. The prism 22 is coated with a fluorescent material 23. Due to the excitation light L1 being incident thereon, the fluorescent material 23 emits fluorescence L4, which illuminates an observation object A that is situated near the output-light side of the probe 2. The fluorescence LA emitted from the fluorescent material 23 efficiently illuminates the observation object A because those rays that are initially emitted into the probe are reflected by the fluorescence reflecting coating 25. This also prevents direct fluorescence that has not illuminated the object from reaching the prism 22. The fluorescence L4 illuminates the observation object A and is reflected by the observation object. (Hereinafter, a prime indicates the light has been reflected by the observation object A.) The reflected fluorescent light L4' is gathered by the probe 2 by being incident on the fluorescence multiplexing prism 24.

The measuring light L3 illuminates the observation object A via the prism 24. The measuring light L3 is reflected by the surface of the observation object A and then returns to the probe 2 as measuring light L3' where it is reflected by the prism 24 and travels, along with the fluorescence L4', back through the gradient index lens 21.

Although the measuring light L3 is P-polarized upon incidence onto the observation object A, the measuring light L3' now includes some S-polarized light (due to being reflected and scattered by the surface of the observation object A). Among the measuring light L3' traveling back through the gradient index lens 21, only the S-polarized component is transmitted through the polarizing beam splitter 26 so as to proceed to the image detector 30. The returned fluorescence L4' traveling with the measuring light L3' is also transmitted through the polarizing beam splitter 26. The polarizing beam splitter 26 reflects the P-polarized reference light L2, thus directing it to the image detector 30. The S-polarized measuring light L3', the P-polarized reference light L2, and fluorescence L4' reflected from the observation object A are multiplexed by the polarizing beam splitter 26, as will now be discussed.

The polarizer 29 is oriented such that only the components of the reference light L2 and measuring light L3' that are linearly polarized at an angle of 45 degrees relative to the polarization directions of the two linearly polarized lights that are orthogonal to each other are transmitted through the polarizer 29. Therefore, the reference light L2 and measuring light L3' transmitted through the polarizer 29 have the same polarization direction. Consequently, if the optical path lengths of the reference light L2 and measuring light (as measured from the second coupler 15 where L2 and L3 are formed from L0 light to the polarizing beam splitter 26 where L2 and L3' are multiplexed) are precisely equal, the reference light L2 and measuring light L3' will interfere and produce interference fringes. Therefore, when interference fringes suddenly appear on the images captured by the image detector, this is indicative of the optical path lengths of the reference light L2 and measuring light being precisely equal. The reflected fluorescence L4' transmitted through the polarizing beam splitter 26 and polarizer 29 is imaged by the gradient index lens 21 onto the image detector 30 so as to provide image information.

As mentioned above, with the probe 2 being paused relative to the observation object A and the movable mirror 19 being moved by the mirror moving mechanism 20 to change the optical path length of the reference light L2, the position of the mirror where interference fringes suddenly appear on the images captured by the image detector 30 corresponds to the optical path lengths of the reference light L2 and the measuring light being equal (i.e., the optical path lengths match). The geometric optical path length of the measuring light from the low coherence light source 7 to the leading end of the probe 2 is fixed. Therefore, the control unit 5 precisely calculates the distance between the leading end of the probe 2 and the surface of the observation object A by subtracting the optical path length of the measuring light to the leading end of the probe 2 from the optical path length of the reference light L2 a0t the position where the optical path lengths of the reference light L2 and the measuring light match. The movable mirror 19 is moved until the reference light L2 and the measuring light interfere with each other, thereby enabling the distance between the leading end of the probe 2 and the surface of the observation object A at each point on the image to be accurately calculated.

Next, the probe 2 is moved relative to the observation object A over a small distance in the axial direction and in the direction orthogonal thereto and paused, and the above measuring process is repeated. By repeating this process, the distance between the leading end of the probe 2 and the surface of the observation object A can be measured over an extensive area.

As described above, in the measuring endoscope apparatus 1 of the present invention, the probe 2 is moved relative to the light source unit 3 in order to place and immobilize the leading end of the probe 2 near an observation object A. Then, the distance to the surface of the observation object A is measured and the surface condition is observed through an image. By moving the probe over small distances and repeating the measurement, the distance to various points of interest on the surface of an observation object A can be accurately measured, thereby enabling the surface profile and roughness of the observation object A to also be accurately measured. When the two light sources 7 and 8 are both energized, the fluorescent image and an interference pattern caused by the reference light L2 and the measuring light L3' are superimposed on the image sensor 30. In this case, the quality of the observed fluorescent image will be degraded due to two different images (namely, the fluorescent image and the image of the surface formed by the measuring light L3') being superimposed. However, both images will be separately recognizable and the measuring light image will contain interference fringes due to this light interfering with the reference light L2. If the observer wants to improve the quality of the images, he may observe only the fluorescent image of the observation object A by turning off the light source 7. If the observer wants to view only the interference pattern image, he may turn on the light source 7 and turn off the light source 8.

In the measuring endoscope apparatus 1 of the present invention, the probe 2 and the light source unit 3 are connected by a single optical fiber 4. This enables the probe 2 to assume any orientation and position so as to observe various observation objects A by merely bending the optical fiber 4. In such a case, the reference light L2 and measuring light each travel through one and the same optical fiber 4 and are each identically influenced by the state of the optical fiber 4 in association with the changed orientation and position of the probe 2, and thus the measuring accuracy does not deteriorate even if the optical fiber 4 is bent when the probe 2 assumes different orientations and positions.

Figure 3:
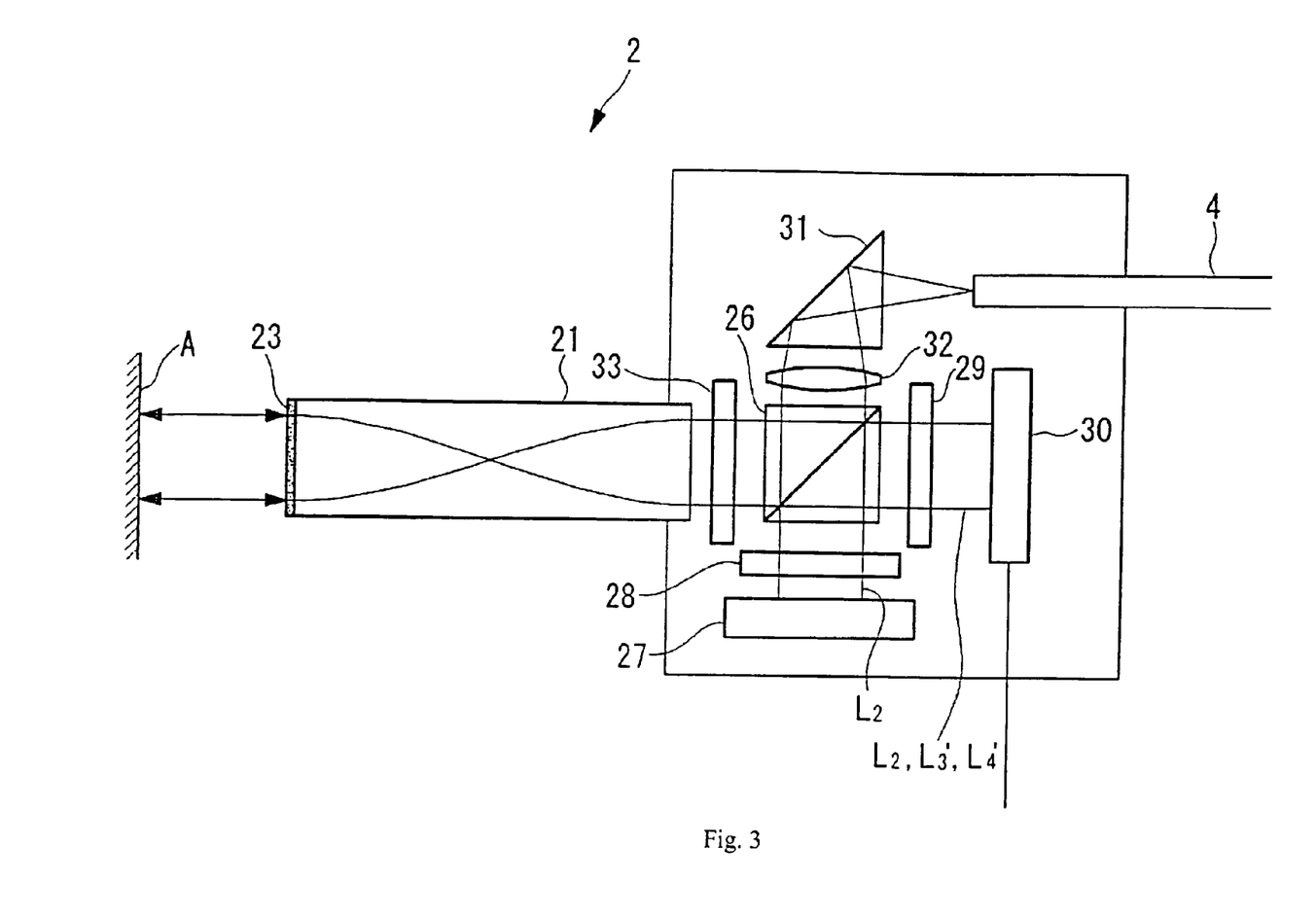
FIG. 3 is an enlarged view schematically showing a first modification to the probe shown in FIG. 2.

In the measuring endoscope apparatus 1 of the invention, the low coherence light L0 emitted from the low coherence light source 7 is P-polarized light; however, it may instead be S-polarized light. Furthermore, the prism 22 is provided at the leading end of the probe 2 for measuring and observing an observation object A that is situated at a distance from the longitudinal axis of the probe 2. As shown in FIG. 3, the prism 22 may be omitted so as to measure and observe an observation object A that is situated axially ahead of the leading end of the probe 2.

As shown in FIG. 3, a quarter-wave plate 33 may be provided between the polarizing beam splitter 26 and the gradient index lens 21. In this way, a large part of the measuring light L3 that is reflected by the polarizing beam splitter 26 and returned (as the measuring light L3') from the observation object A is polarized such that it can be transmitted through the polarizing beam splitter 26, thus enabling more efficient use of the low coherence light L0.

Figure 4:
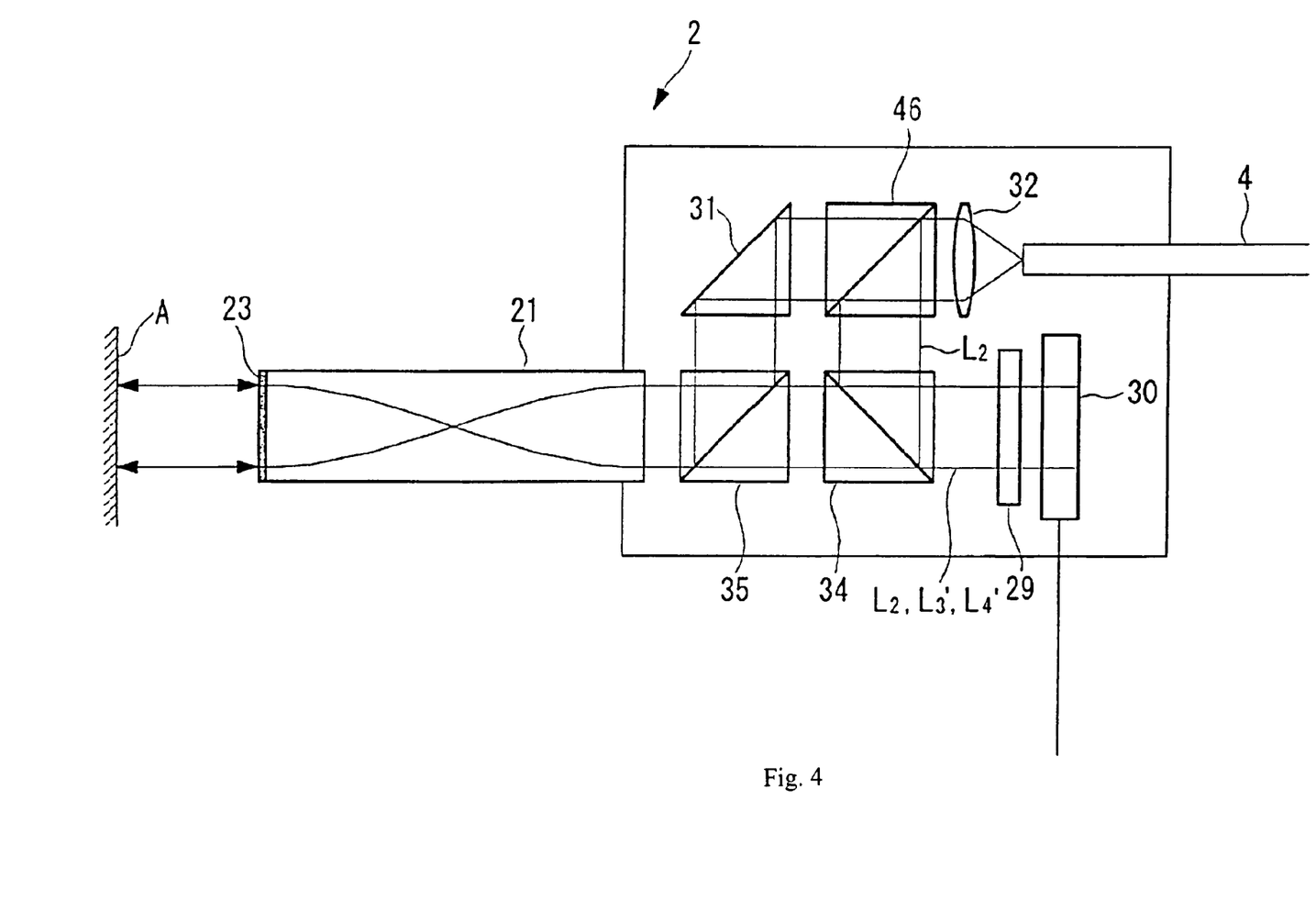
FIG. 4 is an enlarged view schematically showing a second modification to the probe shown in FIG. 2.

Furthermore, as shown in FIG. 4, polarizing beam splitters 46 and 34 and a general beam splitter 35 may be jointly used. In such a case, the reference light L2 is reflected by the polarizing beam splitters 46 and 34 so as to proceed to the image detector 30 while the measuring light L3 is transmitted through the polarizing beam splitter 46 and guided to the leading end of the probe 2 by the prism 31 and beam splitter 35 so as to illuminate an observation object A. The measuring light L3' that returns from the observation object A is transmitted through the beam splitter 35 and polarizing beam splitter 34 and multiplexed with the reference light L2. After these lights pass through the polarizer 29, these lights no longer have polarizations that are orthogonal, and thus they interfere with each other when their optical path lengths match.

Figure 5:
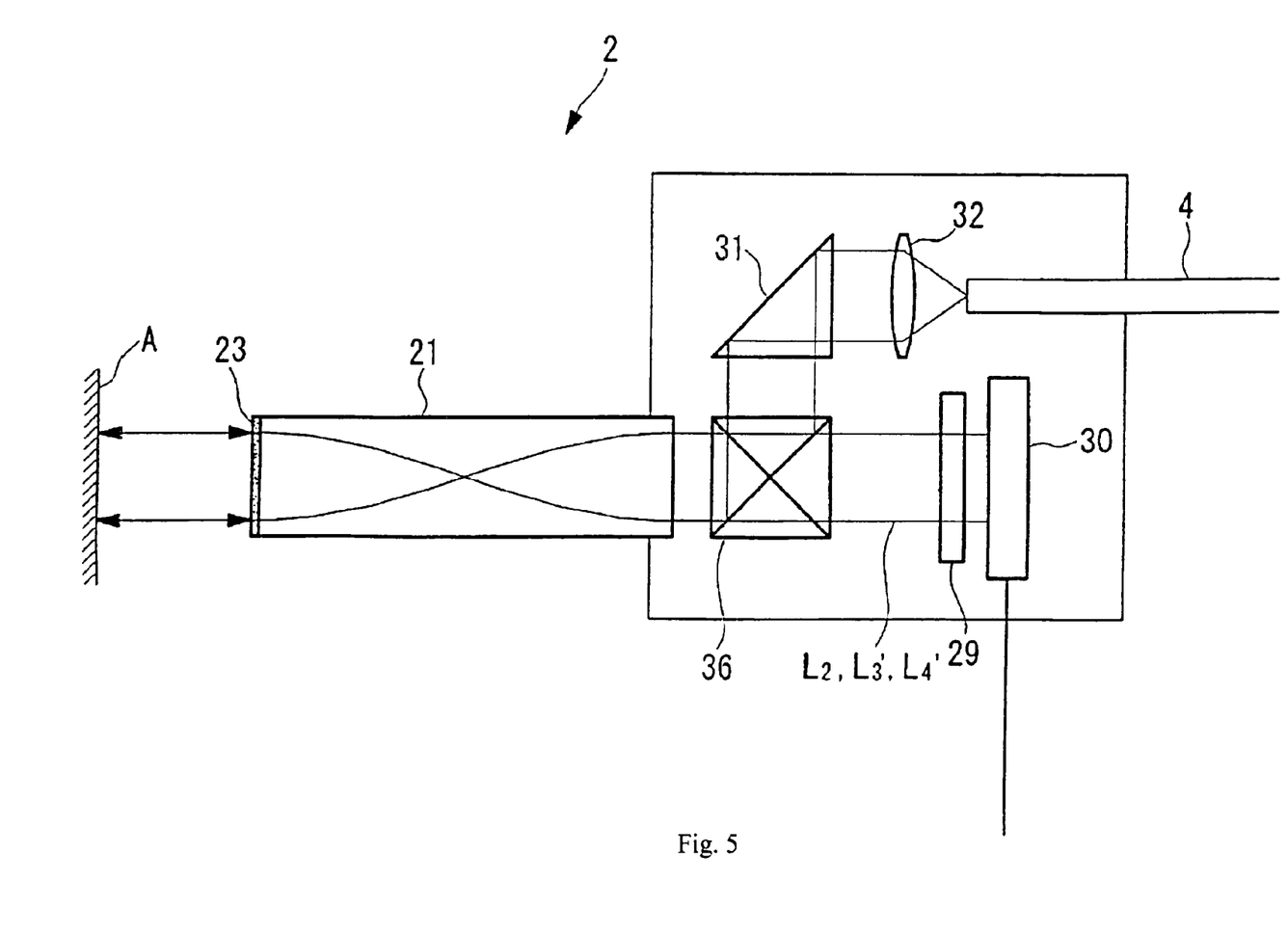
FIG. 5 is an enlarged view schematically showing a third modification to the probe shown in FIG. 2.

The invention being thus described, it will be obvious that the same may be varied in many ways. For example, although a polarizing beam splitter 26 is illustrated in FIGS. 2 and 3, a different beam splitter may be used. For example, provided that the low coherence light source 7 can emit a sufficient intensity of low coherence light L0, multiple general beam splitters can instead be used to separate and multiplex the reference light L2 and the measuring light L3, as shown in FIG. 5. In FIG. 5, the beam splitter is composed of multiple triangular prisms that are bonded together so as to form a combined general beam splitter 36. In this way, the probe 2 can have a simple structure and, therefore, be small in size and lightweight. Also, different arrangements of components and light paths (such as of the quarter-wave plate 28, polarizer 29 and collimating lens 32) relative to the beam splitters 26 and 36 are possible.

Furthermore, in the embodiment shown in the drawing figures, the illumination light source emits excitation light that subsequently is converted into longer-wavelength fluorescent light that illuminates the observation object using a fluorescent material. However, the illumination light source may instead emit light of the same wavelength used to illuminate the observation object, in which case there is no need to provide a fluorescent material in the probe. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A measuring endoscope apparatus comprising:
    a light source unit provided with a low coherence light source that emits low coherence light;
    a probe that illuminates an observation object with said low coherence light and that collects light reflected by said observation object; and
    a single optical fiber that optically connects the probe and the light source unit; wherein
    said light source unit further includes
        a first low coherence light splitting part that splits the low coherence light emitted from the low coherence light source into a first low coherence light and a second low coherence light;
        an optical path length adjustment part that adjusts the optical path length of said first low coherence light; and
        an optical multiplexing part that multiplexes said first low coherence light, after it has passed through the optical path length adjustment part, and said second low coherence light onto said single optical fiber; and
    said probe includes
        a second low coherence light splitting part that splits said first low coherence light from light transmitted through said single optical fiber;
        a low coherence light multiplexing part that multiplexes said second low coherence light after it has been reflected by said observation object and said first low coherence light split by said second low coherence light splitting part;
        a lens that forms images using light returned from said observation object; and
        an image detector that captures an interference pattern of the multiplexed low coherence lights.

2. The measuring endoscope apparatus according to claim 1, and further comprising
    an illumination light source that causes the probe to emit illumination light; wherein
    said probe illuminates said observation object with the illumination light and with low coherence light; and
    said lens forms images using said illumination light reflected by the observation object and using low coherence light reflected by the observation object.

3. The measuring endoscope apparatus according to claim 1, wherein:
    said low coherence light emitted from said low coherence light source is linearly polarized light;
    said optical path length adjustment part includes
        a movable mirror that is movable along the optical path of said first low coherence light and that reflects said first low coherence light so as to reverse the optical path thereof;
        a polarizing member that rotates the polarization direction of said first low coherence light that is reflected by said movable mirror a total of 90 degrees; and
    said second low coherence light splitting part is formed of a polarizing beam splitter that reflects one of said first low coherence light and said second low coherence light and that transmits the other.

4. The measuring endoscope apparatus according to claim 3, wherein:
    said low coherence light multiplexing part comprises
        a polarizing beam splitter that forms said second low coherence light splitting part;
        a mirror that reflects one of the low coherence lights split by said polarizing beam splitter;
        a second polarizing member provided between said mirror and said polarizing beam splitter that rotates the polarization direction of said one low coherence light by a total of 90 degrees; and
        a third polarizing member that makes the polarization directions the same for said first and second low coherence lights that are multiplexed by said polarizing beam splitter.

* * * * *